United States Patent [19]

Rottermann

[11] Patent Number: 4,921,360

[45] Date of Patent: May 1, 1990

[54] LINEAR ROLLER CONTACT BEARING ASSEMBLY

[75] Inventor: Robert Rottermann, Waedenswil, Switzerland

[73] Assignee: Rottermann AG, Waedenswil, Switzerland

[21] Appl. No.: 278,950

[22] PCT Filed: Feb. 25, 1988

[86] PCT No.: PCT/CH88/00044

§ 371 Date: Oct. 26, 1988

§ 102(e) Date: Oct. 26, 1988

[87] PCT Pub. No.: WO88/06686

PCT Pub. Date: Sep. 7, 1988

[30] Foreign Application Priority Data

Feb. 26, 1987 [CH] Switzerland .................... 729/87

[51] Int. Cl.⁵ ............................................ F16C 29/06
[52] U.S. Cl. ...................................... 384/44; 464/168
[58] Field of Search ........................... 384/44, 43, 45; 464/168

[56] References Cited

U.S. PATENT DOCUMENTS 3,194,612  7/1965  Striepe .
3,927,919  12/1975  Bunzli .
3,964,802  6/1976  Pitner .................................. 384/44
4,577,913  3/1986  Metelski .

FOREIGN PATENT DOCUMENTS 1264605  2/1970  United Kingdom .

*Primary Examiner*—Lenard A. Footland
*Attorney, Agent, or Firm*—Tarolli, Sundheim & Covell

[57] ABSTRACT

The invention provides a linear roller contact bearing assembly. It comprises a pair of elongate support means comprising a first and second elongate support member which are displaceable relative to each other in the direction of their longitudinal extension. The first support member is provided with two parallely running support rails arranged one above the other one, and the second support member is provided with a roller rail running parallel to the two support rails and arranged between the two support rails. The two support rails and the roller rail extend substantially along the entire length of the associated support means.

Further, there is provided a rolling members held in position relative to each other by cage members linked together to form an endless row, each of the support rails being provided, at its upper and lower longitudinal surface, with a first track adapted to receive said plurality of rolling members and the roller rail being provided, at its upper and lower longitudinal surfaces, with a second complementary track. Each of said cage members comprises web members arranged on both sides of the cage members to laterally guide the endless row of rolling members held in position by the cage members.

11 Claims, 5 Drawing Sheets

LINEAR ROLLER CONTACT BEARING ASSEMBLY

BACKGROUND OF THE INVENTION

1, Field of the Invention

The present invention relates to a linear roller contact bearing assembly comprising at least one pair of elongate support means including a first and a second elongate support member, said two support members being displaceable relative to each other in the direction of their longitudinal extension. One of the first and second elongate support members may be part of a fixed supporting structure on which is mounted either one longitudinally movable support member or several telescopically extensible support members. For instance, the support members movable relative to each other can be part of the supporting structure of a table used for X-ray diagnosis. In this case, usually several table portions have to be movably supported by the supporting structure and, further, have to be extensible in both directions.

This and other applications require that the linear roller contact bearing assembly, on the one hand, has a height dimension as small as possible and, on the other hand, presents a smooth and precise running behaviour in every position of displacement and in every load condition such that the rigidity of the supporting structure is not impaired by the movable arrangement of its elements.

2, Prior Art

A linear roller contact bearing assembly of the kind mentioned above is disclosed in Swiss Patent No. 568,502. Thereby, the rolling members are guided in rod-like members which are offered in different lengths and are intended to be freely movably mounted between the tracks. Such roller contact bearing rods have the disadvantages that they can support the support members movable relative to each other in longitudinal direction only along a part of their length in any displacement position, and that the rolling members more and more drift away, thereby continuously limiting the theoretically available path of displacement.

Another similar linear roller contact bearing assembly of the kind mentioned above is disclosed in Swiss Patent No. 505,311. This assembly is a ready-to-mount unit, similar to the roller or ball bearings for rotational movement. Because they are finally assembled and in a condition to be be readily used, such linear roller contact bearing assemblies have quite a large height. In order to reliably support a longitudinally extending support member to be able to be longitudinally displaceable, one would require a plurality of such assemblies distributed along the extension of the support member. However, a design incorporating a plurality of supporting assemblies has the disadvantage that the ends of a continuous support member leave the bearing assembly at certain positions and have to be inserted therein again. The inserting operation is difficult due to a possible bending of the support members. Even if additional guiding elements are provided, the alignment of the support member in a loaded condition is hardly possible. It is believed that a precise guiding and supporting and a smooth movability of the support member is practically impossible with a bearing assembly of this kind.

OBJECTS OF THE INVENTION

It is an object of the invention to provide a linear roller contact bearing assembly comprising at least one pair of elongate support means comprising a first and a second elongate support member, said two support members being displaceable relative to each other in the direction of their longitudinal extension, which avoids the disadvantages mentioned hereinbefore.

It is a further objection of the invention to provide a linear roller contact bearing assembly comprising at least one pair of elongate support means comprising a first and a second elongate support member, said two support members being displaceable relative to each other in the direction of their longitudinal extension, which ensures a precise longitudinal guiding of the elongate support members.

It is a still further object of the invention to provide a linear roller contact bearing assembly comprising at least one pair of elongate support means comprising a first and a second elongate support member, said two support members being displaceable relative to each other in the direction of their longitudinal extension, which has a lower height dimension than similar bearing assemblies known in the prior art.

Finally, it is an object of the invention to provide a linear roller contact bearing assembly comprising at least one pair of elongate support means comprising a first and a second elongate support member, said two support members being displaceable relative to each other in the direction of their longitudinal extension, which can easily be adapted to every length of the support member to which it is connected.

SUMMARY OF THE INVENTION

In order to realize these and other objects, the invention provides a linear roller contact bearing assembly comprising at least one pair of elongate support means comprising a first and a second elongate support member, said two support members being displaceable relative to each other in the direction of their longitudinal extension. The first support member is provided with two parallely running support rails arranged one above the other one, and the second support member is provided with a roller rail running parallel to said two support rails and arranged between said two support rails. The two support rails and the roller rail extend substantially along the entire length of the associated support means. A plurality of rolling members is held in position relative to each other by cage members linked together to form an endless row.

Each of said support rails is provided, at its upper and lower longitudinal surface, with a first track adapted to receive said plurality of rolling members and the roller rail is provided, at its upper and lower longitudinal surface, with a second complementary track. Each of the cage members provided for holding the rolling members in position comprises web members arranged on both sides of the cage members and running parallel to the tracks provided for the rolling members. Each support rail has a longitudinal groove provided in at least one of said upper or lower longitudinal surfaces, the bottom of the longitudinal groove constituting a track for the rolling members and the side surfaces of the longitudinal groove guiding said cage members via said web members in longitudinal direction.

Thanks to the provision of the linear roller contact bearing according to the invention, the elongate support members being movable relative to each other are supported with reference to each other along the whole overlapping length portion thereof by means of rolling members. Thus, an improved load distribution results which is better than in an arrangement having separate bearing members limited to certain length portions. Consequently, smaller rolling members can be used with the result that the overall dimensions of the bearing assembly are smaller.

Usually, two linear roller contact bearing assemblies are provided, running parallel to each other, for the linearly displaceable supporting and bearing of two support means. Thereby, the two linear roller contact bearing assemblies and the individual bearing portions thereof have different functions. The rolling members provided in the bearing assembly portion where they roll along the said complementary track provided on the roller rail ensure the guiding function in longitudinal direction while they do not have any guiding function in the region of the bearing assembly including the track portion in which the rolling members are just rolling back to their initial position.

It is advantageous to provide one of the linear roller contact bearing assemblies, besides the guiding in longitudinal direction, with means for a lateral guiding of the loaded rolling members for receiving the laterally acting forces; in the case of the other linear roller contact bearing assembly, a lateral guiding of the rolling members is not required.

In this way, the individual portions of the linear roller contact bearing assembly may be adjusted easily in accordance with the different functions they have to fulfill; this may be done by arranging the associated tracks for the rolling members provided on the support rails and the roller rail in different height positions. The rolling members which have to perform a guiding function only in longitudinal direction are recessed in the loaded bearing assembly portion in the longitudinal grooves of the support rails such that they can perform just the above mentioned function of longitudinal guiding in cooperation with the complementary track provided in the longitudinal surface of the roller rail.

If these rolling members are guided in a track located even deeper in the longitudinal grooves of the support rails, e.g. due to reasons which will be explained hereinafter, the complementary track provided on the roller rail and cooperating with the above mentioned portion of the bearing assembly can be constituted by an elevated surface portion of the roller rail.

The solution for a portion of the bearing assembly providing additional lateral guidance of the rolling members consists in that the associated support rail and the roller rail both comprise longitudinal grooves provided in the longitudinal surfaces facing each other in which the rolling members are laterally guided. Thereby, the rolling members preferably merge into both longitudinal grooves by the same amount. In contrary thereto, the rolling members of the associated bearing assembly portion driven back to their initial load receiving position can fully be received in a longitudinal groove having a track surface which is located at an even lower level.

For holding the rolling members in position, there is provided a plurality of cage members forming an endless row and being connected to each other in tape- or chain-like manner by linking means. Each cage member is provided with web members mounted on both lateral sides thereof; the web members run parallel to the track and are preferably symmetrically arranged with reference to the axis of the rolling members. On the one hand, these web members serve to laterally guide the cage members holding the rolling members in position within the longitudinal grooves of the support rails. On the other hand, in certain bearing assembly portions, they can have a support function.

Thus, for instance, it is advantageous if the longitudinal groove provided at the lower longitudinal surface of the support rails comprises longitudinally running ribs located at the edges of the open side of the longitudinal groove and directed towards each other which engage said web members of the cage members and thereby limit a taking-off of unloaded rolling members from the track.

Thus, any hang-over of the rolling member row is avoided which could occur if the two support rails are considerably displaced relative to each other and a long portion of the rolling member row is unloaded. In fact, the same is true for the portions of the bearing assembly where the rolling members are moving back. However, the longitudinal grooves of these bearing assembly portions can be closed by suitable cover means being part of the structure of the associated support member with the result that it is not necessary to provide the aforementioned ribs.

If the aforementioned longitudinal ribs are present, it is necessary for the track of the rolling members in the interior of the longitudinal grooves located at their bottom surface to be located at a very low level, under certain circumstances with such a depth that the rolling members do not project at all or only insufficiently out of the longitudinal groove; in this case, they can not roll on an even plane surface of the roller rail. As already mentioned, to avoid this condition, it is necessary to design the complementary track as a track surface projecting over the surface of the associated roller rail.

The supporting function provided by said longitudinal ribs cooperating with the lateral web members provided on the cage members holding the rolling members in position also facilitates the mounting and assembling of the guiding tapes for the rolling members. A symmetrical arrangement of the web members further offers the advantage that the lateral orientation has not to be considered during the mounting of the cage members holding the rolling members in position. A further advantage is that in bearing assembly portions providing an additional lateral guiding of the rolling members the web members are simultaneously guided in both longitudinal grooves associated to each other in lateral direction.

The cage members for holding the rolling members in position are linked together by linking means such that the row of the cage members can be tensioned in longitudinal direction as a whole. Thereby, the connection between the individual cage members is pivotal such that the row of cage members holding the rolling members in position can be deflected with reference to their direction of running within a limited space.

For instance, the cage members for holding the rolling members in position can be interconnected by a linking means such that the row of cage members holding the rolling members in position can be shortened or lengthened like a chain. However, also a flexible tape-like member can be used as linking means. Preferably, the cage members holding the rolling members in position consist of a resilient material, e.g. of thermoplastic material whereby the holding means for the rolling members are integrally formed on the cage members.

BRIEF DESCRIPTION OF THE DRAWINGS

In the following, some embodiments of the invention will be described in detail, with reference to the accompanying drawings, in which.

DESCRIPTION OF A PREFERRED EMBODIMENT

Figure 1:
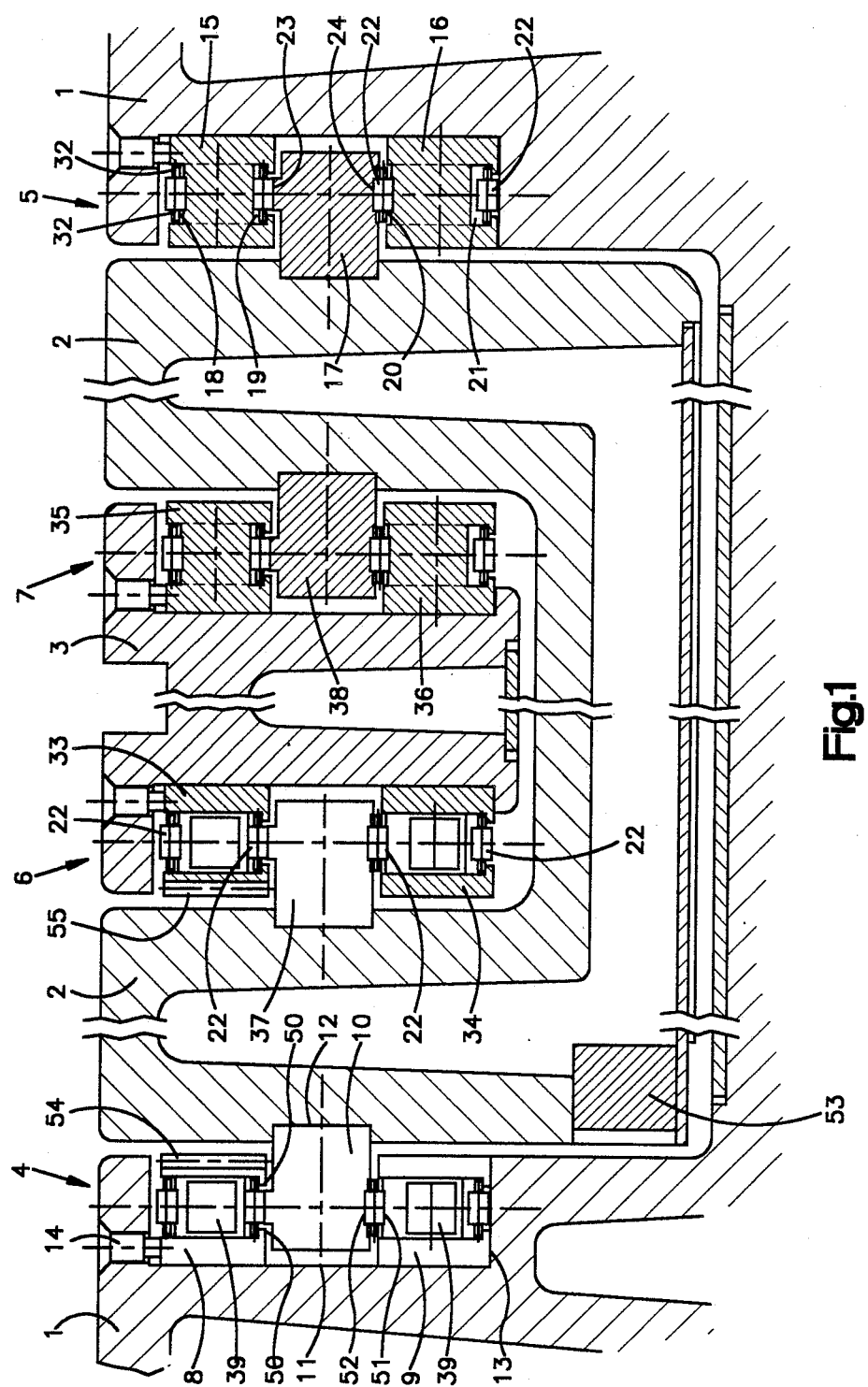
FIG. 1 shows a cross sectional view of a supporting structure comprising three support members movable relative to each other and incorporating the linear roller contact bearing assembly of the invention.

According to FIG. 1, there is shown a cross sectional view of a support structure having three support members 1, 2 and 3 which are movable relative to each other in longitudinal direction in a telescopic manner. The outer support member 1 may be part of a fixed supporting body. Linear roller contact bearing assemblies are provided for the mutual displaceable mounting of the support members 1, 2 and 3 which extend along the entire length of the said support members. Particularly, two linear bearing assemblies 4 and 5 are provided between the support members 1 and 2, and two linear bearing assemblies 6 and 7 are provided between the support members 2 and 3. The linear bearing assembly 4 comprises two parallelly running support rails 8 and 9 mounted on the outer support member 1 one above the other one, as well as a roller rail 10 extending between the support rails 8 and 9 and running parallel thereto; the roller rail 10 is fixed to the central support member 2. The support rails and the roller rail are fixed to the associated support member e.g. by means of (not shown) screws. For this purpose, the support member 1 comprises a mounting surface 11 and the support member 2 comprises a mounting surface 12. The roller rail 10 may also be a constructive part of the support member 2. The lower support rail 9 rests on a shoulder 13 provided on the support member 1. An adjustment screw 14 is provided to enable the linear bearing assembly 4 to be set under a biasing force. The corresponding linear bearing assembly 5 comprises, in similar manner, two support rails 15 and 16 as well as a roller rail 17 fixed to the support members 1 and 2 by means of corresponding fixing means.

Each of the support rails (i.e. the support rails 15 and 16 associated with the linear bearing assembly 5) comprises longitudinal grooves 18, 19 and 20, 21, respectively, provided at their upper and lower longitudinal surfaces. Together, they each form a continuous track for an endless row of cylindrical rolling members 22 whereby the bottom of the grooves constitutes the track portion for the rolling members. The roller rail 17 arranged therebetween is provided, at its upper and its lower surface, with complementary tracks 23 and 24, respectively.

The rolling members are held in position by cage members linked together in the kind of a tape or a chain as will be further described with reference to FIGS. 2 to 4.

The linear bearing assemblies 6 and 7, incorporating the associated support rails 33, 34 and 35, 36, respectively, are designed and fixed to the associated support members 2 and 3 basically in the same way as the linear bearing assemblies 4 and 5.

Figure 2:
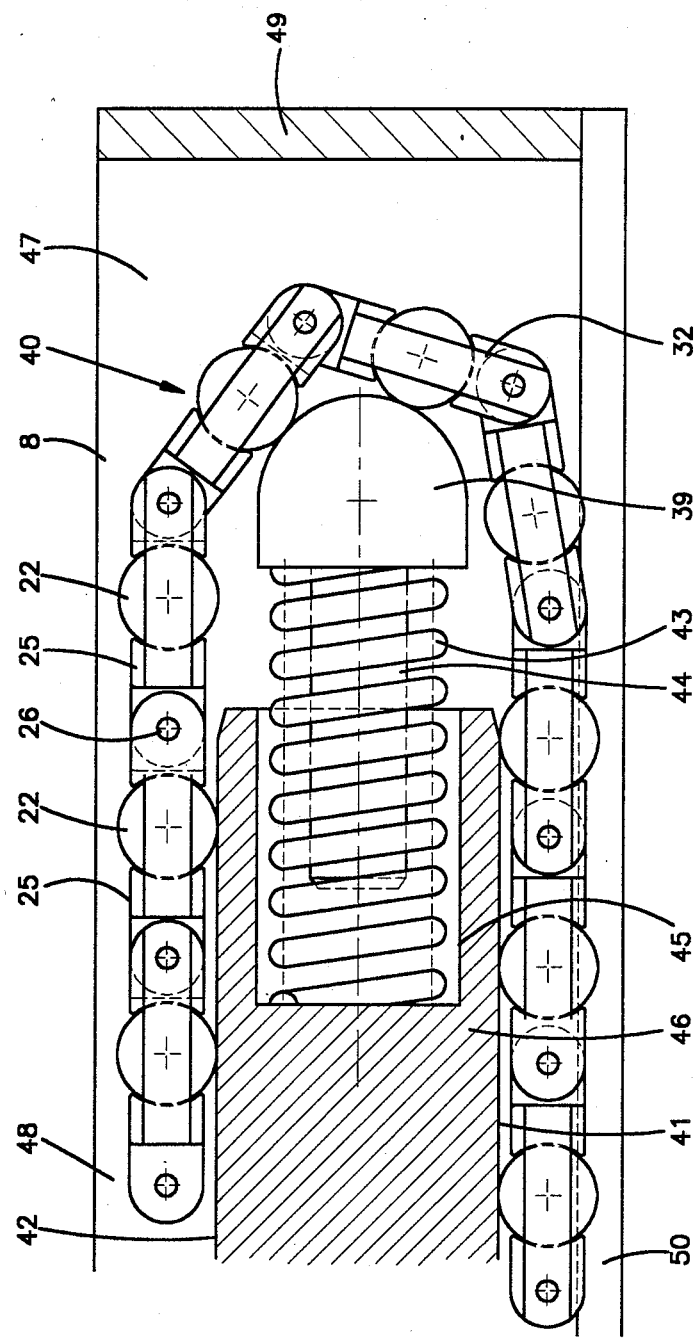
FIG. 2 shows a longitudinal sectional view of a end portion of a support rail in a larger scale.
Figure 3:
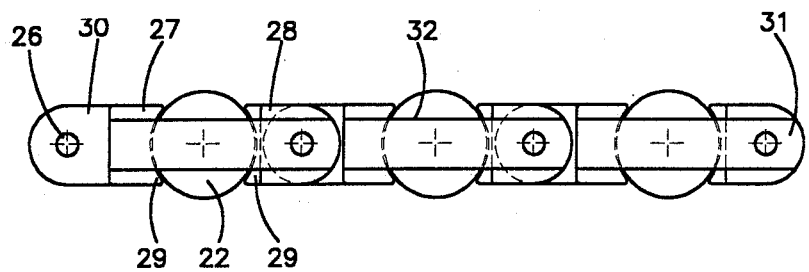
FIGS. 3+4 show a side view and a top view, respectively, of a portion of the roller member assembly incorporating cylindrical roller members, according to a first embodiment.
Figure 4:
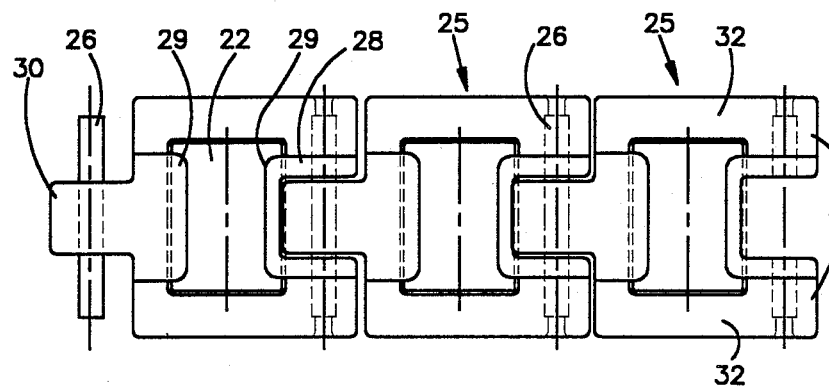

According to FIGS. 2, 3 and 4, the rolling members 22 are received and held in position by cage members 25 made of plastic material and connected to each other to form a tape- or chain-like endless row. Each cage member 25 is linked to the adjacent one to be pivotal around an axis 26. Each cage member 25 consists of two cage member bodies 27 and 28 provided with resilient guiding lips 29 on which the link members 30 and 31 are integrally formed. The cage member bodies 27 and 28 are connected to each other on both sides by means of webs 32 which run parallel to the track of the rolling members 22 and are arranged symmetrically with regard to the axis of the rolling members. These webs 32 have a thickness which is less than the one of the cage member bodies 27 and 28 and serve for the lateral guidance of the rolling members 22.

A further function of the aforementioned webs 32 is to laterally guide the cage members 25 holding the rolling members in position, in cooperation with the side walls of the longitudinal grooves 18, 19 and 20, 21, respectively, provided in the support rails (cf. FIG. 1, linear bearing assembly 5).

As an example, in FIG. 2, the deflection of the endless row of rolling members at the one end of the support rail 8 is illustrated; it is understood that the deflection can be performed in the same way at both ends of all support rails of each linear bearing assembly.

Accordingly, a semicircular mushroom-shaped deflection member 39 is provided by means of which the portion of the row of rolling members 40 is deflected from the track 41 to the back track 42. The mushroom-shaped member 39 is biased by means of a spring 43 which receives the shaft 44 of the deflection member 39 and rests at the bottom of a longitudinal bore 45 provided in the core 46 of the support rail 8. The tape- or chain-like row of rolling members is held in a tensioned condition under the influence of the spring 43. The mushroom-shaped deflection member 39 may be designed in another way than shown in FIG. 2: Instead of the rolling members 22 rolling over the surface of the deflection member 39, the webs 32 can glide over the surface of the deflection member 39.

The deflection chamber is laterally delimited by longitudinal walls 47 lying in the same plane as the side wall 48 of the longitudinal groove (18 to 21 in FIG. 1)

serving as a track means for the rolling member with the result that the lateral guiding of the cage members 25 holding the rolling members 22 in position is also ensured in the region of said deflection chamber. At the end of the associated rail, the deflection chamber is closed by a wall 49. It is understood that all elements necessary for the deflection of the row of rolling members 22 can be constituted by a separate unit which can be fixed to the end of the support rail.

Located at the lower side of the support rail 8, there are provided longitudinal ribs 50 provided at the edges of the longitudinal groove and directed inwards. The webs 32 of the cage members 25 holding the rolling members in position slide on these ribs if the rolling members 22 are in an unloaded condition. Corresponding ribs 50 are also provided at the lower side of the support rails 15, 16, 33, 34, 35 and 36; they limit a take-off of unloaded rolling members from the track.

The difference regarding the profile shape of the individual support rails and roller rails consists in the fact that the tracks and the complementary tracks for the loaded rolling members are arranged at a different level, according to their individual function. The rolling members associated with the support rails 8, 15 and 16 of the linear bearing assembly 4, 5 and the rolling members of the support rails 33, 35 and 36 of the linear bearing assembly 6, 7 serve only for the guiding of the support rails in longitudinal direction. Thereby, the rolling members of the upper support rails 8, 15, 33 and 35 run at a lower level in the associated longitudinal grooves due to the presence of the aforementioned longitudinal ribs 50, lower than the rolling members of the lower support rails 16 and 17. This is the reason why the complementary tracks, e.g. the track 23, of all roller rails 10, 17, 37 and 38 are raised and project above their surface.

On the other hand, the rolling members running between the lower support rail 9 and 34, respectively, and the roller rail 10 and 37, respectively, of the linear bearing assemblies 4 and 6 are guided also in lateral direction; thus, they can receive, to a limited degree, lateral forces acting on the support members 2 and 3. For this purpose, the associated support rails and roller rails, e.g. 9 and 11, respectively, comprise longitudinal grooves 51 and 52, respectively, provided in their surfaces facing each other and having less depth. The rolling members are laterally guided in these longitudinal grooves. The aforementioned longitudinal grooves 51, 52 are adapted to the dimensions of the rolling members 22 and, therefore, are smaller in width than the longitudinal grooves which laterally guide the cage members 25 holding the rolling members in position. The latter longitudinal grooves, however, may be provided also in that portions of the linear bearing assembly in which the rolling members are laterally guided, if necessary, whereby the webs of the cage members are guided, on the one hand, in the support rail and, on the other hand, in the roller rail equally.

In the case where the support member 2 is to be moved by a suitable power driven means, the support member 2 can be provided with a toothed rack 53 engaging a driving pinion of the power driven means. A power transmission from the support member 1 to the support member 3 may be realized, for instance, by providing the support rails 8 and 33 with teeth rows 54 and 55 connected to each other by a suitable gear box.

Figure 5:
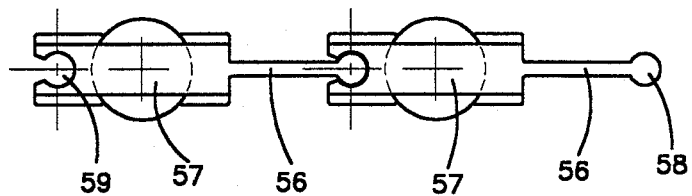
FIGS. 5+6 show a side view and a top view, respectively, of a portion of the roller member assembly incorporating cylindrical roller members, according to a second embodiment.
Figure 6:
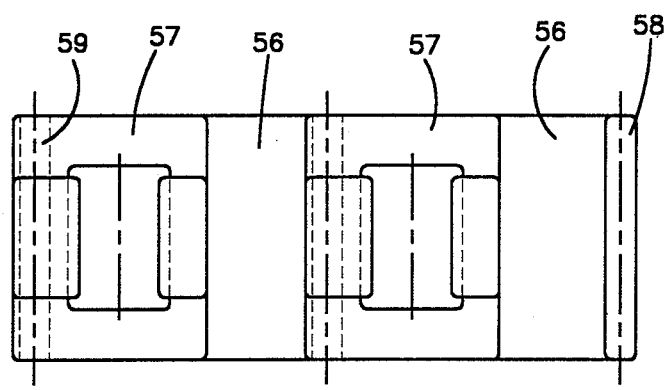

FIGS. 5 and 6 illustrate an embodiment similar to the one shown in FIGS. 3 and 4. However, the cage members 57 of FIGS. 5 and 6 holding the rolling members in position are connected to each other by means of a flexible tape portion 56. It forms an integral part of the cage member 57 and has a free end which is provided with a bead 58. The opposite end of the cage member 57 is provided with a cup-like recess 59 engaging with the bead 58 of the adjacent cage member 57. The plug-in connection between bead 58 and cup-like recess 59 realized in this way may be rigid or pivotal.

Figure 7:
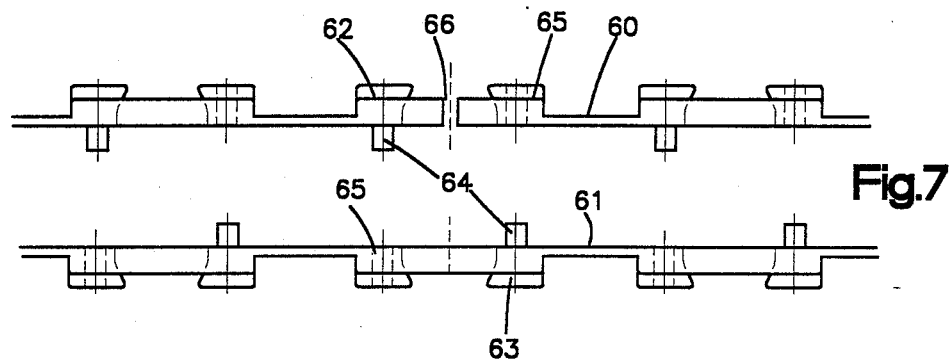
FIGS. 7+8 show a side view and a top view, respectively, of a portion of the roller member assembly incorporating cylindrical roller members, according to a third embodiment.
Figure 8:
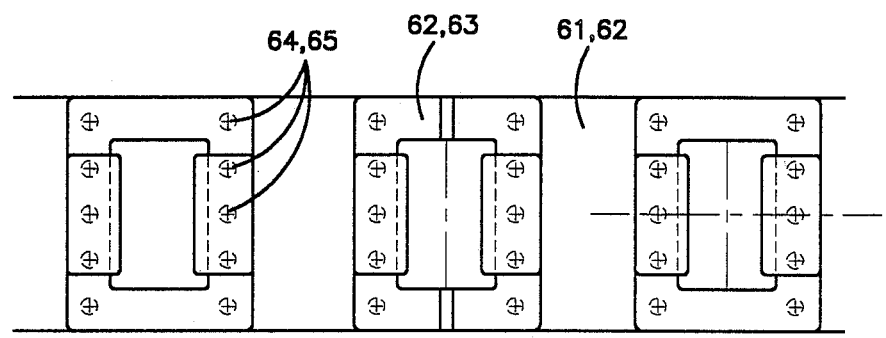

A further embodiment of the arrangement of rolling members in an endless row is illustrated in FIGS. 7 and 8. In this embodiment, the cage members holding the rolling members in position are essentially identically designed as is illustrated in FIGS. 3 and 4 as far as the fixing of the rolling members and the arrangement of the webs is concerned. However, in contrast thereto, the cage members holding the rolling members in position each are constituted by two separate cage member bodies 62 and 63 forming integral parts of two flexible tape-like members 60 and 61 arranged one above the other one and shown separately in the drawings according to FIGS. 7 and 8. The two associated cage member bodies 62 and 63 are connected to each other by plug-in fixing means, e.g. by means of pins 64 and corresponding receiving members 65 cooperating like a snap-fastener. The joint 66 of each of the two tapes 60, 61 is located in the region of a cage member whereby the joints of the two tapes are not provided at the same cage member but situated offset to each other in longitudinal direction of the tapes. Thus, the two tapes 60, 61 can be united to a single tape member to form an endless tape by means of the fixing means 64, 65 mentioned hereinbefore.

Under certain circumstances, due to operational reasons, the longitudinal supporting including the lateral guiding must respond to higher requirements as far as the forces acting on the support structure and the running conditions are concerned; it is possible that linear bearing assemblies using cylindrical rolling members according to FIG. 1 might not respond to these requirements. In these cases, ball bearing assemblies or so-called cross roller bearings having prismatic tracks are preferred.

Figure 9:
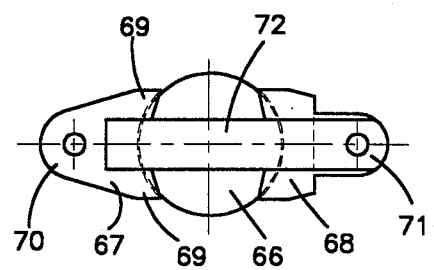
FIGS. 9+10 show a side view and a top view, respectively, of a cage member for holding a ball-shaped roller member in position.
Figure 10:
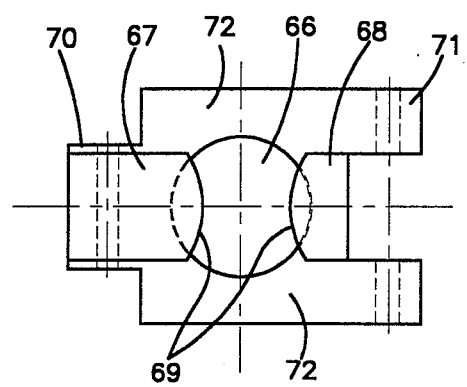

In FIGS. 9 and 10, an embodiment is illustrated which makes use of ball-shaped rolling members 66. Similarly to the illustration in FIGS. 3 and 4, two cage member bodies 67 and 68 are provided to receive the ball-shaped rolling member 66 and to hold them in position. The two cage member bodies 67 and 68 are provided with resilient guiding lips 69 and integrally formed linking means 70 and 71. They are connected to each other by means of a central web 72.

Figure 11:
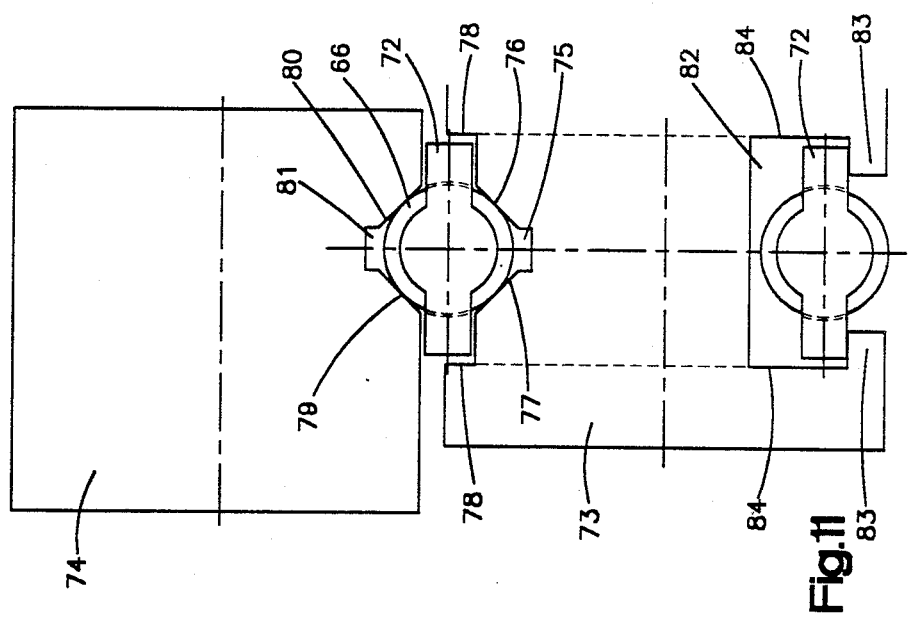
FIG. 11 shows a cross sectional view of a roller rail and a support rail having ball-shaped rolling members and corresponding cage members according to FIGS. 9 and 10.

According to FIG. 11, there is shown a portion of a linear roller contact bearing assembly using the cage members holding the rolling members in position according to FIGS. 9 and 10. The support rail 73 comprises a longitudinal groove 75 provided in the longitudinal surface thereof which faces the associated roller rail. The groove 75 has two inclined side walls 76 and 77 constituting a prismatic track for the ball-shaped rolling members 66. The outer shoulders 78 of the groove 75 serve for lateral guiding of the webs 72 of the cage members. The complementary track provided in the roller rail is constituted, in a similar manner, by two inclined side walls 79 and 80 of a longitudinal groove 81. However, in this case, a lateral guiding of the webs 72 is not necessary. The longitudinal groove 82 provided in the lower longitudinal surface of the support rail 73 serves as a return path for the rolling members 66. The webs 72 slide, similarly as explained in connection with FIG. 1, on the surface of longitudinal ribs 83 and are laterally guided by means of the side walls 84 of the longitudinal groove 82.

Figure 12:
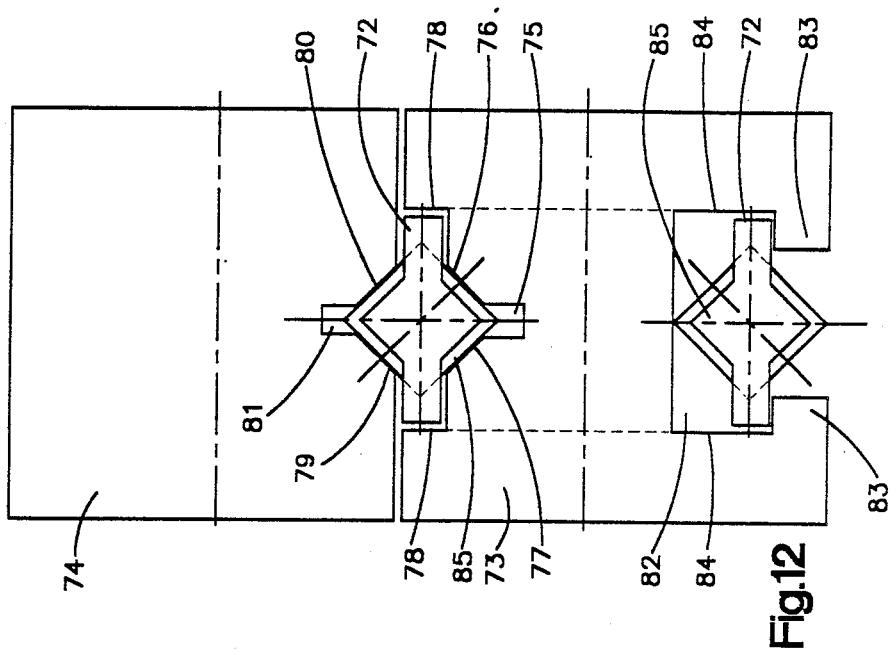
FIG. 12 shows a cross sectional view of a roller rail and a support rail having cylindrical rolling members, the axes thereof being inclined by 45° relative to the track and which cross each other.

An embodiment essentially identical to the one discussed in connection with FIG. 11 is illustrated in FIG. 12. However, in this case, crossed cylindrical rolling members 85 are provided. Identical parts and elements have identical reference numerals in FIGS. 11 and 12 and the same remarks made in connection with FIG. 11 are also true in connection with FIG. 12.

What I claim is:

1. A linear roller contact bearing assembly comprising:
   at least one pair of elongate support means comprising a first and a second elongate support member, said two support members being displaceable relative to each other in the direction of their longitudinal extension;
   said first support member being provided with two parallely running support rails arranged one above the other one;
   said second support member being provided with a roller rail running parallel to said two support rails and arranged between said two support rails;
   said two support rails and said roller rail extending substantially along the entire length of the associated support means;
   a plurality of rolling members held in position relative to each other by cage members linked together to form an endless row;
   each of said support rails being provided, at its upper and lower longitudinal surface, with a first track adapted to receive said plurality of rolling members and the roller rail being provided, at its upper and lower longitudinal surface, with a second complementary track;
   each of said cage members provided for holding the rolling members in position comprising web members arranged on both sides of the cage members and running parallel to the tracks provided for the rolling members;
   whereby each support rail has a longitudinal groove provided in at least one of said upper or lower longitudinal surfaces, the bottom of said longitudinal groove constituting a track for the rolling members and the side surfaces of said longitudinal groove guiding said cage members via said web members in longitudinal direction.

2. A linear roller contact bearing assembly according to claim 1 in which said longitudinal groove provided at the lower longitudinal surface of said support rails comprises longitudinally running ribs located at the edges of the open side of said longitudinal groove and directed towards each other which engage said webs of said cage members and thereby limit a taking-off of unloaded rolling members from the track.

3. A linear roller contact bearing assembly according to claim 1 in which said web members provided on said cage members are arranged, with regard to their height, symmetrically to the axis of the rolling members.

4. A linear roller contact bearing assembly according to claim 1 in which at least one of said support rails and said roller rail are provided with longitudinally running grooves provided in the respective surfaces facing each other in which the rolling members are laterally guided.

5. A linear roller contact bearing assembly according to claim 1 in which said cage members holding said rolling members in position each are interconnected by linkage means, the axes of said linkage means being spaced from said rolling members.

6. A linear roller contact bearing assembly according to claim 5 in which said cage members holding said rolling members in position each are interconnected by a flexible tape member.

7. A linear roller contact bearing assembly according to claim 6 in which a flexible tape member is integrally formed to one end of said cage members holding said rolling members in position, said tape member comprising a bead located at its free end, and in which the other end of said cage members holding said rolling members in position is provided with a cuplike recess in which the bead of the adjacent cage member engages.

8. A linear roller contact bearing assembly according to claim 6 in which said cage members holding the rolling members in position are integrally formed in two halves on two flexible tapes located one above the other one, in which the two complementary halves together forming said cage members are connected to each other by means of plug-in connecting means, in which the joint of each flexible tape is located in the region of a cage member, and in which the joints of the two flexible tapes are offset relative to each other.

9. A linear roller contact bearing assembly comprising:
   at least one pair of elongate support means comprising a first and a second elongate support member, said two support members being displaceable relative to each other in the direction of their longitudinal extension;
   said first support member being provided with two parallely running support rails arranged one above the other one;
   said second support member being provided with a roller rail running parallel to said two support rails and arranged between said two support rails;
   said two support rails and said roller rail extending substantially along the entire length of the associated support means;
   a plurality of rolling members held in position relative to each other by cage members linked together to form an endless row;
   each of said support rails being provided, at its upper and lower longitudinal surface, with a first track adapted to receive said plurality of rolling members and the roller rails being provided, at its upper and lower longitudinal surface, with a second complementary track;
   each of said cage members provided for holding the rolling members in position comprising web members arranged on both sides of the cage members and running parallel to the track provided for the rolling members;
   whereby each support rail has a longitudinal groove provided in at least one of said upper or lower longitudinal surfaces, the bottom of said longitudinal groove constituting a track for the rolling members and the side surfaces of said longitudinal groove guiding said cage members via said web members in longitudinal direction;
   a semicircular mushroom-shaped deflection member is provided at the ends of each support rail which is spring loaded in order to guide the rolling members from said track provided on one side of said support rail to the track provided on the other side of said support rail and vice versa.

10. A linear roller contact bearing assembly comprising:
- at least one pair of elongate support means comprising a first and a second elongate support member, said two support members being displaceable relative to each other in the direction of their longitudinal extension;
- said first support member being provided with two parallely running support rails arranged one above the other one;
- said second support member being provided with a roller rail running parallel to said two support rails and arranged between said two support rails;
- said two support rails and said roller rail extending substantially along the entire length of the associated support means;
- a plurality of rolling members held in position relative to each other by cage members linked together to form an endless row;
- each of said support rails being provided, at its upper and lower longitudinal surface, with a first track adapted to receive said plurality of rolling members and the roller rails being provided, at its upper and lower longitudinal surface, with a second complementary track;
- each of said cage members provided for holding the rolling members in position comprising web members arranged on both sides of the cage members and running parallel to the track provided for the rolling members;
- whereby each support rail has a longitudinal groove provided in at least one of said upper or lower longitudinal surfaces, the bottom of said longitudinal groove constituting a track for the rolling members and the side surfaces of said longitudinal groove guiding said cage members via said web members in longitudinal direction;

said upper complementary track is constituted by a surface projecting over the upper surface of said roller rail.

11. Apparatus comprising:
- a first and a second elongate support member, said first and second support members being displaceable relative to each other in the direction of their longitudinal extension;
- said first support member having two parallel support rails arranged one above the other one;
- said second support member having a roller rail running parallel to said two support rails and arranged between said two support rails;
- said two support rails and said roller rail extending substantially along the entire length of said first and second support members;
- a plurality of rolling members held in position relative to each other by cage members linked together to form an endless chain;
- each of said support rails having, at its upper and lower longitudinal surfaces, a first track adapted to receive said plurality of rolling members and the roller rail having, at its upper and lower longitudinal surface, a second complementary track;
- each of said cage members holding the rolling members in position and having web members arranged on both sides of the cage members and running parallel to the track provided for the rolling members;
- each support rail having a longitudinal groove in at least one of said upper or lower longitudinal surfaces, the bottom of said longitudinal groove constituting said first track for the rolling members and the side surfaces of said longitudinal groove guiding said cage members in a longitudinal direction by engaging said web members.

* * * * *